United States Patent [19]
Ewen et al.

[11] Patent Number: 5,387,568
[45] Date of Patent: Feb. 7, 1995

[54] PREPARATION OF METALLOCENE CATALYSTS FOR POLYMERIZATION OF OLEFINS

[75] Inventors: John A. Ewen, Houston, Tex.; Michael J. Elder, Raleigh, N.C.

[73] Assignee: Fina Technology, Inc., Dallas, Tex.

[21] Appl. No.: 867,572

[22] Filed: Apr. 13, 1992

Related U.S. Application Data

[63] Continuation of Ser. No. 791,803, Nov. 13, 1991, abandoned, which is a continuation-in-part of Ser. No. 419,046, Oct. 30, 1989, abandoned.

[51] Int. Cl.$^6$ .............................................. B01J 31/00
[52] U.S. Cl. .................................. 502/104; 502/117; 502/118; 502/122; 502/152; 502/155; 502/103
[58] Field of Search .............. 502/104, 117, 118, 122, 502/152, 155, 103

[56] References Cited

U.S. PATENT DOCUMENTS

| | | | |
|---|---|---|---|
| 4,701,432 | 10/1987 | Welborn | 502/114 |
| 4,752,597 | 6/1988 | Turner | 502/104 |
| 4,794,096 | 12/1988 | Ewen | 502/117 |
| 4,799,180 | 12/1988 | Turner | 526/160 |
| 4,808,561 | 2/1989 | Welborn | 502/104 |
| 4,841,004 | 6/1989 | Kaminsky | 526/160 |
| 4,849,487 | 7/1989 | Kaminsky | 526/160 |
| 4,871,705 | 10/1989 | Hoel | 502/117 |
| 4,892,851 | 1/1990 | Ewen | 502/104 |
| 5,036,034 | 7/1991 | Ewen | 502/117 |
| 5,198,401 | 3/1993 | Turner et al. | 502/155 |

FOREIGN PATENT DOCUMENTS

| | | |
|---|---|---|
| 277003 | 8/1988 | European Pat. Off. . |
| 277004 | 8/1988 | European Pat. Off. . |

OTHER PUBLICATIONS

Synthesis and Insertion Reactions of Cationic Alkyl bis(cyclopentadienyl) titanium Complexes–Bochman et al, J. Chem. Soc. Chem. Commun. pp. 1610–1611 (1986).

Cationic Alkyl bis(cyclopentadienyl) titanium Complexes. Synthesis, Reactions with CO and t–BuNC and the structure of [Cp$_2$TI(n$^2$–C(Me)N–t–Bu) (CN–t–Bu)BPh$_4$MeCN Bochman et al, Organometallics: pp. 2556–2563 (1987).

Ionic, Base–Free Zirconium Catalysts for Ethylene Polymerization–Hlatky et al J. Am. Chem. Soc. Vol. III, pp. 2728–2729 (1989).

Ethylene Polymerization by a Cationic Dicyclopentadienylzirconium (IV) Alkyl Complex–Jordan et al, J. Am. Chem. Soc., vol. 108, pp. 7410–7411 (1986).

Reactive Cationic Dicyclopentadienylzirconium (IV) Complexes–Jordan et al J. Am. Chem. Soc., vol. 108, pp. 1718–1719 (1986).

*Primary Examiner*—Asok Pal
*Attorney, Agent, or Firm*—Jim D. Wheelington; M. Norwood Cheairs

[57] ABSTRACT

This invention uses a new method of producing ionic metallocene compounds. These compounds are useful as catalysts for polymerization of olefins, primarily propylene. This method uses an ionizing agent which ionizes the neutral metallocene compound. The ionizing ionic compound does not contain an active proton and contains a carbonium, oxonium or sulfonium cation. The anion of the ionizing ionic compound is not coordinated or is only loosely coordinated to the metallocene cation and is chemically unreactive with the metallocene cation. Examples of such compounds are triphenylcarbenium tetrakis(pentafluorophenyl)boronate, triphenylcarbenium tris(pentafluorophenyl)phenyl boronate and triphenylcarbeniumtris(pentafluorophenyl)4-trimethylsilyl-2,3,5,6-tetrafluorophenylboronate.

The process of making catalysts with this invention produces catalysts having high activity and does not produce by-products which can inhibit catalyst activity. This new synthesis is a clean reaction which does not produce a Lewis base. The process generates active catalysts by removing a methyl anion from a group IVB metallocene derivative.

18 Claims, No Drawings

PREPARATION OF METALLOCENE CATALYSTS FOR POLYMERIZATION OF OLEFINS

This is a continuation of copending application Ser. No. 07/791,803 filed Nov. 13, 1991, now abandoned, which was a continuation-in-part of application Ser. No. 07/419,046 filed on Oct. 30, 1989, now abandoned.

BACKGROUND OF THE INVENTION

1. Field of the Invention

This invention relates, in general, to a process for preparing catalysts and, specifically, to a process for preparing catalysts for polymerization of olefins.

2. Description of Related Art

Olefins, especially propylene, may be polymerized to form polyolefins in crystalline and amorphous forms. Isotactic and syndiotactic are crystalline and atactic is amorphous. Isotactic olefins are typically described as having groups attached to the tertiary carbon atoms of successive monomeric units on the same side of a hypothetical plane through the main chain of the polymer, i.e., the groups are all above or below the plane. This structure may be represented as follows:

Isotactic polypropylene is capable of being a highly crystalline polymer with a high melting point and other desirable physical properties that are considerably different from the polymer in an amorphous (noncrystalline) state.

A syndiotactic polymers are those in which the groups attached to the tertiary carbon atoms of successive monomeric units lie on alternate sides of the plane of the polymer. Syndiotactic structure is represented as follows:

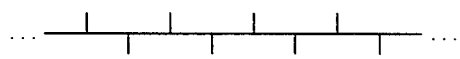

Atactic polymer shows no regular order of repeating unit configurations. In commercial applications, a certain percentage of atactic polymer is typically produced with the crystalline forms.

Polymerization of olefins is primarily with Zeigler-Natta catalysts. One family of Zeigler-Natta catalysts is Group IVB metallocene compounds with methylaluminoxane as a cocatalyst. It has been demonstrated that Zeigler-Natta catalysts for olefin polymerization can be formed by combining a Group IVB metallocene with an ionic compound.

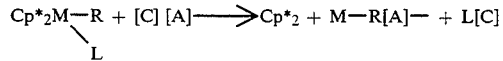

Cp*—pentamethylcyclopentadienyl
M—Group IVB metal
R—alkyl
L—ligand
[C]—cation
[A]—anion The resulting compound is a metallocene cation which acts as a catalyst. The cation [C] of the ionic compound reacts with the metallocene to generate an ion pair. The anion, [A], is not coordinated or is only loosely coordinated with the cationic metallocene.

The following methods have been used to produce the above reaction:

One-Electron Oxidation—This method is illustrated in "Ethylene Polymerization by a Cationic Dicyclopentadienylzirconium(IV) Alkyl Complex" R. F. Jordan, C. S. Bajgur, R. Willett, B. Scott, J. Am. Chem. Soc., p. 7410–7411, Vol. 108 (1986). These early examples used a Lewis base to make the metal cation less electrophilic and [BPh4]— was the anion where Ph is $C_6H_5$. The reaction occurred in a coordinating solvent. These catalysts were usually of low activity.

Protonation—This method is illustrated by "Synthesis and Insertion Reactions of Cationic Alkylbis(cyclopentadienyl)titanium Complexes" M. Bochmann, L. M. Wilson, J. Chem. Soc. Commun., p. 1610–1611, (1986); "Cationic Alkylbis(cyclopentadienyl)titanium Complexes" M. Bochmann, L. Wilson, Organometallics, p. 2556–2563, Vol. 6, (1987); Insertion Reactions of Nitriles in Cationic Alkylbis(cyclopentadienyl)titanium Complexes, M. Bochmann, L. Wilson, Organometallics, p. 1147–1154, Vol. 7 (1987).

European Patent Application 0-277-003 relates to a catalyst prepared by a protonation method. A is (cyclopentadienyl) metal compound is combined with a compound having a cation capable of donating a proton and an anion having a plurality of boron atoms. For example, the following reaction illustrates the invention:

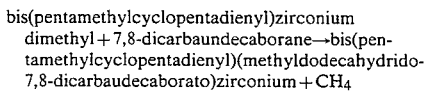

European Patent Application 0-277-004 also relates to a catalyst prepared by a protonation method. A bis(-cyclopentadienyl) metal compound is combined with an ionic compound having a cation which will irreversibly react with a ligand on the metal compound and an anion having a plurality of lipophilic radicals around a metal or metalloid ion. For example, the following reaction illustrates the invention:

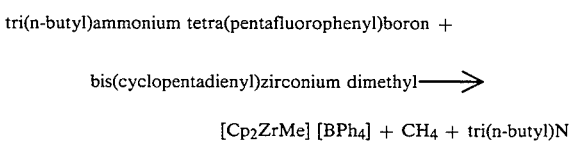

A by-product of the protonation reaction is a Lewis base (amine) some of which can coordinate to the cations and thus inhibit catalyst activity. Starting materials must be chosen carefully to avoid generating particular amines which are catalyst poisons. In addition, the catalyst and the polymer produced with this catalyst contains undesirable and toxic residual amines.

Ligand abstraction—The ligand abstraction method is illustrated in "Multiple Metal-Carbon Bonds" R. R Schrock, P. R. Sharp, J. Am. Chem. Soc., p.2389–2399, Vol. 100, No, 8 (Apr. 2, 1978).

In most known processes, methylaluminoxane (MAO) is added with the metallocene compound to act as a cocatalyst. The function of MAO is to initiate the alkylation and promote ionization of the metallocene compound. The cocatalyst is a scavenging agent which reduces the poisons which decrease catalyst activity. Present known processes require a large excess of MAO to be added. MAO has the disadvantage of being relatively expensive. This results in high costs for the catalyst system.

SUMMARY OF THE INVENTION

Accordingly, it is an object of this invention to provide a process for making an improved catalyst for polymerization of olefins.

And, it is an object of this invention to provide a process for making a catalyst with relatively high activity.

Also, it is an object of this invention to synthesize metallocene cations with no Lewis base as a side product.

Further, it is an object of this invention to eliminate the necessity to chose starting materials to control the by-products which may be produced as catalyst poisons.

Additionally, it is an object of this invention to eliminate methylaluminoxane (MAO) as a cocatalyst in polymerization of polypropylene.

Moreover, it is an object of this invention to produce polymers which are free of aluminum oxide.

As well, it is an object of this invention to produce a polymer which is free of undesirable and toxic amines.

These and other objects are accomplished by making a catalyst for polymerization of olefins comprising mixing an ionizing ionic compound with a neutral metallocene and allowing contact between the ionizing ionic compound and the neutral metallocene such that the metallocene is ionized by the ionizing ionic compound and an ion pair is formed in which the metallocene cation acts as a catalyst. The neutral metallocene is of the general formula:

$$R''_n(CpR_4)(CpR'_4)MeQ_p$$

wherein $(CpR_4)$ and $(CpR'_4)$ are a cyclopentadienyl or substituted cyclopentadienyl, $(CpR_4)$ and $(CpR'_4)$ being the same of different, R and R' is hydrogen or a hydrocarbyl radical from 1–20 carbon atoms, R being the same or different, R' being the same or different, R'' is a structural bridge between $(CpR_4)$ and $(CpR'_4)$ imparting stereorigidity to the metallocene, n is 0 or 1 designating whether the bridge is not present or is present, Me is a Group IIIB, IVB, VB, or VIB metal, Q is a hydride, a halogen, an amide or a hydrocarbyl radical, each Q being the same or different, except only one Q can be hydride and a p is the valence of Me minus two. The ionizing ionic compound does not contain an active proton and contains a carbonium, oxonium or sulfonium cation and wherein the anion of the ionizing ionic compound is not coordinated or is only loosely coordinated to the metallocene cation and is chemically unreactive with the metallocene cation. This catalyst can be used in polymerization of olefins.

DESCRIPTION OF THE INVENTION

The invention is for a process of producing a catalyst for polymerization of olefins by ionizing a metallocene with an ionizing agent which does not contain an active proton and which has an anion which is not coordinated or is only loosely coordinated to the cation of the metallocene. The anion is also chemically unreactive with the cation.

In the new synthesis procedure the ionizing ionic compound is mixed with neutral metallocenes producing the following reaction:

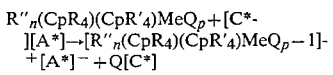

where $(CpR_4)$ and $(CpR'_4)$ are a cyclopentadienyl or a substituted cyclopentadienyl group, $(CpR_4)$ and $(CpR'_4)$ being the same or different, R and R' is hydrogen or a hydrocarbyl radical from 1–20 carbon atoms, R being the same or different, R' being the same or different, R'' is a structural bridge between $(CpR_4)$ and $(CpR'_4)$ imparting stereorigidity to the metallocenes, n is 0 or 1 designating whether the bridge is not present or is present, Me is a Group IIIB, IVB, VB or VIB metal, Q is a hydride, a halogen, an amide or a hydrocarbyl radical, each Q being the same or different, except that if Q is a hydride only one Q can be hydride, p is the valence of Me minus 2, C* is a carbonium, oxonium or sulfonium cation and A* is an anion which is not coordinated or is only loosely coordinated to the cation of the metallocene and is chemically unreactive with $R''(CpR_4)(CpR'_4)MeQ_{p-1}$.

Each reactant is placed in a solvent which is not coordinated or is only loosely coordinated with the metallocene cation. Examples of such solvents are toluene and methylene chloride. The preferred solvent is toluene. The two reactants are dissolved separately in the same solvent and are mixed together at room temperature at a mole ratio ranging from 10 moles of metallocene:1 mole of ionizing compound to 1 mole of metallocene: 10 moles of ionizing compound. A preferred mole ratio is from 2 moles of metallocene:1 mole of ionizing compound to 1 mole of metallocene:2 moles of ionizing compound. The most preferred mole ratio is 1 mole of metallocene:1 mole of ionizing compound. After mixing, the mixture is added to an olefin under conditions to effect polymerization.

An ionic compound containing a carbonium, oxonium or sulfonium cation, such as triphenylcarbenium tetrakis(pentafluorophenyl) boronate, triphenylcarbeniumtris(pentafluorophenyl)phenylboronate or triphenylcarbenium tris(pentafluorophenyl)4-trimethylsilyl-2,3,5,6-tetrafluorophenyl boronate, is mixed with a neutral metallocene. The ionic compound acts an ionizing agent which ionizes the metallocene. A cationic metallocene catalyst is formed. The ionic compound preferably contains a carbenium cation and most preferably contains a triphenylcarbenium cation. The anion preferably contains boron.

Boron ionic ionizing agents are produced by the following reactions:

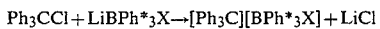

where Ph is phenyl, Ph* is pentafluorophenyl and X is Ph*, Ph or trimethylsilyl-2,3,5,6-tetrafluorophenyl (TMSPh*). Triphenylcarbenium [Ph₃C] is a cation. Tetrakis(pentafluorophenyl) boronate [BPh*₄] tris (pentafluorophenyl)phenyl boronate [B(Ph*₃)(Ph)] and tris(pentafluorophenyl)4-trimethylsilyl-2,3,5,6-tetrafluorophenyl boronate [B(Ph*₃)(TMSPh*)] are anions.

Triphenylcarbenium tetrakis(pentafluorophenyl) boronate was produced with the following laboratory method. A bright yellow solution of 27.1 mmoles of Ph₃CCl in 150 cc of methylene chloride was added dropwise at 25° C. to 25 gm of LiB(C$_6$F$_5$)$_4$ slurried in 350 cc of methylene chloride. The orange slurry was stirred for 30 minutes and then filtered. The solids containing [Ph$_3$C][BPh*$_4$] and LiCl were washed with methylene chloride. The combined wash and filtrate was concentrated to 75 cc and then cannulated into 400 cc of pentane with rapid stirring. The solids were washed several times with pentane and small amounts of toluene until a bright yellow powder of [Ph$_3$C][BPh*$_4$] was obtained. The yield was 20 grams (75%).

Triphenylcarbenium tris(pentafluorophenyl)phenyl boronate and triphenylcarbenium tris(pentafluorophenyl)4-trimethyl silyl-2,3,5,6-tetrafluorophenyl boronate were prepared by adding one equivalent of LiX to tris(pentafluorophenyl) boronate to form LiBPh$_3$*X which was then reacted with Ph$_3$CCl.

The neutral metallocene is of the general formula:

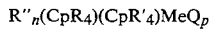

wherein (CpR$_4$) and (CpR'$_4$) are a cyclopentadienyl or a substituted cyclopentadienyl, (CpR$_4$) and (CpR'$_4$) being the same or different, R and R' is hydrogen or a hydrocarbyl radical from 1–20 carbon atoms, preferably R and R' are hydrogen or a hydrocarbyl radical from 1–4 carbon atoms which may be bonded to a single carbon atom or to two carbon atoms of the Cp ring, R being the same or different, R' being the same or different, R" is a structural bridge between (CpR$_4$) and (CpR'$_4$) imparting stereorigidity to the metallocene, preferably R" preferably is a divalent radical, more preferably is a divalent radical selected from the group consisting of a linear hydrocarbyl radical having 1–20 carbon atoms, a cyclic hydrocarbyl radical having 3–15 carbon atoms, an aryl radical, a diaryl methyl radical, a diaryl silyl radical, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical and most preferably is an alkyl radical with 1–15 carbon atoms in which one or two carbon atoms are the alkyl bridging component and the remaining carbon atoms are substituent components to the bridging carbon atom(s), specifically, is a isopropylene or ethylene radical, n is 0 or 1, designating whether the bridge is not present or is present, Me is a Group IIIB, IVB, VB or VIB metal, preferably a Group IVB metal, such as titanium, hafnium or zirconium, most preferably zirconium for higher catalyst activity and hafnium for higher molecular weight, Q is a hydride, a halogen, an amide or a hydrocarbyl radical such as an alkyl, aryl, alkenyl, aklyaryl or arylaklyl radical having from 1 to 20 carbon atoms, each Q being the same or different, except that if Q is a hydride only one Q can be hydride and p is the valence of Me minus 2. The preferred neutral metallocenes are ethylene bis(tetrahydroindenyl)zirconium dimethyl, ethylene bis(indenyl)zirconium dimethyl and isopropylidene (cyclopentadienyl-1-fluorenyl)zirconium dimethyl. The most preferred neutral metallocene is ethylene bis(indenyl)zirconium dimethyl.

Polymerization of olefins with the catalysts disclosed above is accomplished by any of the known means for polymerization of olefins with metallocene catalysts, for example polymerization in bulk, slurry or gas phase. For polypropylene, polymerization temperatures range from −80° C. to 150° C., preferably 25° C. to 90° C. and most preferably from 50° C. to 80° C. The polymers produced can be of any of the crystalline or amorphous structures, depending on the catalyst chosen and the polymerization conditions. However, either isotactic or syndiotactic will predominantly be produced.

The olefins for which this invention is most effective are those having two to eight carbon atoms. The preferred olefins are ethylene and propylene, the most preferred being propylene.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE I 55 mg of triphenylcarbenium tetrakis(pentafluorophenyl) boronate was dissolved in 5 cc of toluene. 40 mg of Et(IndH4)$_2$ZrMe$_2$ was dissolved in 5 cc of toluene. The two solutions were mixed together for 5 minutes at room temperature, giving a clear yellow solution.

The mixture was added by syringe to a 2 liter Zipperclave reactor. 1.0 liter of propylene was added to the reactor. Reactor temperature was set to 70° C. The contents of the reactor were agitated. The temperature remained at 70° C. during the sixty minute polymerization period after which propylene was vented from the reactor. The contents of the reactor were washed with acetone and dried in a vacuum oven.

The polymer was analyzed for melting point. The melting point was derived from differential scanning calorimetry (DSC). The results are shown in Table I.

EXAMPLE II

The procedure of Example I was repeated using 40 mg of triphenylcarbenium tetrakis(pentafluorophenyl) boronate and 20 mg of Et(IndH4)$_2$ZrMe$_2$. The results are shown in Table I.

EXAMPLE III

The procedure of Example I was repeated using 30 mg of triphenylcarbenium tetrakis(pentafluorophenyl) boronate and 15 mg of Et(IndH4)$_2$ZrMe$_2$. The reactor temperature was set at 80° C. and the temperature remained at 80° C. The results are shown in Table I.

EXAMPLE IV

The procedure of Example I was repeated using 60 mg of triphenylcarbenium tetrakis(pentafluorophenyl) boronate and 60 mg of Et(IndH4)$_2$ZrMe$_2$. Reactor temperature was set at 50° C. and the temperature remained at 100° C. Run time was 10 minutes. The results are shown in Table I.

EXAMPLE V

The procedure of Example I was repeated using 55 mg of triphenylcarbenium tetrakis(pentafluorophenyl) boronate and 50 mg of Et(IndH4)$_2$ZrMe$_2$. Reactor temperature was set at 50° C. and increased to 168° C. Run time was 10 minutes. The results are shown in Table I.

EXAMPLE VI

The procedure of Example I was repeated using 100 mg of triphenylcarbenium tetrakis(pentafluorophenyl) boronate and 60 mg of Et(Ind)$_2$ZrMe$_2$. Reactor temper-

EXAMPLE VII

The procedure of Example I was repeated using 100 mg of triphenylcarbenium tetrakis(pentafluorophenyl) boronate and 60 mg of Et(Ind)$_2$ZrMe$_2$. The temperature was set at 50° C. and remained at 50° C. The results are shown in Table I.

EXAMPLE VIII

The procedure of Example I was repeated using 120 mg of triphenylcarbenium tetrakis(pentafluorophenyl) boronate and 80 mg of iPr(Cp-1-Flu)ZrMe$_2$. Reactor temperature was set at 70° C. and the temperature increased above 100° C. The results are shown in Table I.

EXAMPLE IX

The procedure of Example I was repeated using 100 mg of triphenylcarbenium tetrakis(pentafluorophenyl) boronate and 60 mg of iPr(Cp-1-Flu)ZrMe$_2$. Reactor temperature was set at 70° C. and the temperature increased to 78° C. The results are shown in Table I.

EXAMPLE X

The procedure of Example I was repeated using 60 mg of triphenylcarbenium tetrakis(pentafluorophenyl) boronate and 40 mg of iPr(Cp-1-Flu)ZrMe$_2$. Reactor temperature was set at 70° C. The results are shown in Table I.

lene. The reactor temperature was raised to 50° C. and held at that temperatue for one hour. During this period the reactor components were strirred. At the end of the polymerizaton period, the temperature was lowereed to room temperature and the monomer was vented. The reactor was opened; the polymer was isolated and dried in a vacuum oven.

The polymer was analyzed for melting point and molecular weight. The melting point was derived from Differential Scanning Calorimetry (DSC). The molecular weight was obtained from Gel Permeation Chromatography (GPC). The results are shown in Table I.

EXAMPLE XII

The procedure of Example XI was followed except 0.50 mg of iPr[Cp-1-Flu]Zr(CH$_3$)$_2$ and 6.0 mg of triphenylcarbenium tris(pentafluorophenyl) 4-trimethylsilyl-2,3,5,6-tetrafluorobenzene boronate was used.

EXAMPLE XIII

The procedure of Example XI was followed except 2.50 mg of iPr[Cp-1-Flu)]Zr(CH$_3$)$_2$ and 30.0 mg of triphenylcarbenium tris(pentafluorophenyl)4-trimethylsilyl-2,3,5,6-tetrafluorobenzene boronate was used.

EXAMPLE XIV

The procedure of Example XI was followed except 2.50 mg of iPr[Cp1-1Flu)] Zr(CH$_3$)$_2$ and 40.0 mg of triphenylcarbenium tris(pentafluorophenyl)phenyl boronate was used.

TABLE I

| RUN # | CATALYST, + | mg | IONIZING AGENT, ++ | mg | TIME, min. | TEMP, °C. | YIELD, gm | Melting Temp °C. |
|---|---|---|---|---|---|---|---|---|
| 1 | Et(IndH4)$_2$ZrMe$_2$ | 40 | [Ph3C][BPh*4] | 55 | 60 | 70 | 9 | 138 |
| 2 | | 20 | | 40 | 60 | 50 | 55 | 138 |
| 3 | | 15 | | 30 | 80 | 80 | 45 | 131 |
| 4 | | 50 | | 60 | 10 | 50* | 74 | 134 |
| 5 | | 50 | | 55 | 10 | 50* | 135 | — |
| 6 | Et(Ind)$_2$ZrMe$_2$ | 60 | [Ph3C][BPh*4] | 100 | 60 | 50 | 19 | 137 |
| 7 | | 60 | | 100 | 30 | 50 | 11 | 134 |
| 8 | iPr(Cp-1-Flu)$_2$ZrMe$_2$ | 80 | [Ph3C][BPh*4] | 120 | 5 | 70* | 224 | 115 |
| 9 | | 60 | | 100 | 60 | 70** | 51 | — |
| 10 | | 40 | | 60 | 60 | 70*** | 186 | 119 |
| 11 | | 2.50 | [Ph3C][BPh*3(Ph)] | 40 | 60 | 50 | 210 | 136 |
| 12 | | 0.50 | [Ph3C][BPh*3(TMSPh*)] | 6 | 60 | 50 | 5 | 137 |
| 13 | | 2.50 | | 30 | 60 | 50 | 77 | 135 |
| 14 | | 2.50 | | 40 | 60 | 50 | 171 | 133 |

+
Et (IndH4)$_2$ZrMe$_2$ = Ethylenebis(tetrahydroindenyl)zirconium dimethyl
Et(Ind)$_2$ZrMe$_2$ = Ethylenebis(indenyl)zirconium dimethyl
iPr(Cp-1-Flu)ZrMe$_2$ = isopropylidene(cyclopentadienyl-1-fluorenyl)zirconium dimethyl
++
[Ph$_3$C][BPh*$_4$] = triphenylcarbenium tetrakis(pentafluorophenyl) boronate.
[Ph$_3$C][B(Ph*$_3$)(Ph)] = triphenylcarbenium tris(pentafluorophenyl)phenyl boronate
[Ph$_3$C][B(Ph*$_3$)(TMSPh*)] = triphenylcarbenium tri(pentafluorophenyl) 4-trimethylsilyl-2,3,5,6-tetrafluorophenyl boronate
*Runaway reaction; peak reaction temperature >100° C.
**Exotherm; peak reaction temperature 78° C.
***Exotherm

EXAMPLE XI

A solution of 2.5 mg of iPr[Cp-1-Flu]Zr(CH$_3$)$_2$ and a hexane solution containing one millimole of triethylaluminum in about 10 ml of dry toluene at room temperature was prepared. In a separate container 40.0 mg of triphenylcarbenium tris(pentafluorophenyl) (phenyl) boronate was dissolved in about 10 ml of dry toluene.

By means of a stainless steel catalyst transfer cyclinder, the first solution was added along with 0.4 liter of propylene to a 2 liter Zipperclave reactor containing 0.4 liter propylene and one millimole of trietylalumminum at room termpaerture. The second solution was then injected into the reactor along with 0.6 liter of propy- The process described by this invention synthesizes cations which are used as catalysts in olefin polymerization. The process of making catalysts with this invention produces catalysts having high activity and does not produce by-products which can inhibit catalyst activity. This new synthesis is a clean reaction which does not produce a Lewis base. The process generates active catalysts by removing a methyl anion from a neutral group IVB metallocene.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for making a catalyst for polymerization of olefins comprising:
    a) mixing an ionizing ionic compound with a neutral metallocene; and
    b) allowing contact between the ionizing ionic compound and the neutral metallocene such that the metallocene is ionized by the ionizing ionic compound and an ion pair is formed in which the metallocene cation acts as a catalyst; wherein the neutral metallocene is of the general formula:

wherein (CpR$_4$) and (CpR'$_4$) are a cyclopentadienyl or a substituted cyclopentadienyl group, (CpR$_4$) and (CpR'$_4$) being the same or different, R and R' is hydrogen or a hydrocarbyl radical from 1–20 carbon atoms, R being the same or different, R' being the same or different, R" is a structural bridge between (CpR$_4$) and (CpR'$_4$) imparting stereorigidity to the metallocene, n being 0 or 1, Me is a Group IIIB, IVB, VB or VIB metal, Q is a hydride, a halogen, an amide or a hydrocarbyl radical, each Q being the same or different, except only one Q can be hydride and p is the valence of Me minus 2;
    wherein the ionizing ionic compound does not contain an active proton and contains a carbonium, oxonium or sulfonium cation; and
    wherein the anion of the ionizing ionic compound is not coordinated or is only loosely coordinated to the metallocene cation and is chemically unreactive with the metallocene cation.

2. A process as recited in claim 1 wherein, before mixing, the ionizing ionic compound is dissolved in a solvent which is not coordinated or is only loosely coordinated with the metallocene cation.

3. A process as recited in claim 2 wherein, before mixing the neutral metallocene is separately dissolved in the same solvent.

4. A process as recited in claim 1 wherein the mole ratio of the neutral metallocene to the ionic compound ranges from 10 moles of metallocene:1 mole of ionizing compound to 1 mole of metallocene:10 moles of ionizing compound.

5. A process as recited in claim 4 wherein the mole ratio of the neutral metallocene to the ionic compound ranges from 2 moles of metallocene:1 mole of ionizing compound to 1 mole of metallocene:2 moles of ionizing compound.

6. A process as recited in claim 5 wherein the mole ratio of the neutral metallocene to the ionic compound ranges is 1 mole of metallocene:1 mole of ionizing compound.

7. A process as recited in claim 1 wherein the metal is a Group IVB metal chosen from the group consisting of titanium, zirconium and hafnium.

8. A process as recited in claim 7 wherein the metal is hafnium.

9. A process as recited in claim 7 wherein the metal is zirconium.

10. A process as recited in claim 1 wherein Q is a hydrocarbyl radical chosen from the group consisting of an alkyl radical, an aryl radical, an alkenyl radical, an alkylaryl radical and an arylakyl radical having from 1 to 20 carbon atoms, each Q being the same of different.

11. A process as recited in claim 1 wherein the neutral metallocene is chosen from the group consisting of ethylene bis(tetrahydroindenyl)zirconium dimethyl, ethylene bis(indenyl)zirconium dimethyl and isopropylidene (cyclopentadienyl-1-fluorenyl)zirconium dimethyl.

12. A process as recited in claim 11 wherein the neutral metallocene is ethylenebis(indenyl) zirconium dimethyl.

13. A process as recited in claim 1 wherein the ionic compound is selected from the group consisting of triphenylcarbenium tetrakis(pentafluorophenyl) boronate, triphenylcarbenium tris(pentafluorophenyl)phenyl boronate and triphenylcarbenium tris(pentafluorophenyl)4-trimethylsilyl-2,3,5,6-tetrafluorophenyl boronate.

14. A process as recited in claim 2 wherein the solvent is toluene.

15. A process as recited in claim 1 wherein R" is a divalent radical.

16. A process as recited in claim 15 wherein R" is selected from the group consisting of a linear hydrocarbyl radical having 1–20 carbon atoms, a cyclic hydrocarbyl radical having 3–15 carbon atoms, an aryl radical, a diaryl methyl radical, a diaryl silyl radical, a silicon hydrocarbyl radical, a germanium hydrocarbyl radical, a phosphorous hydrocarbyl radical, a nitrogen hydrocarbyl radical, a boron hydrocarbyl radical, and an aluminum hydrocarbyl radical.

17. A process as recited in claim 16 wherein R" is an alkyl radical with 1–15 carbon atoms in which one or two carbon atoms are the alkyl bridging component and the remaining carbon atoms are substituent components to the bridging carbon atom(s)

18. A process as recited in claim 17 wherein R" is selected from the group consisting of isopropylene and ethylene.

* * * * *